(12) United States Patent
Knee

(10) Patent No.: US 6,323,904 B1
(45) Date of Patent: *Nov. 27, 2001

(54) MULTIFUNCTION VIDEO COMPRESSION CIRCUIT

(75) Inventor: Michael James Knee, Petersfield (GB)

(73) Assignee: Electrocraft Laboratories Limited, Hampshire (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/171,561
(22) PCT Filed: Apr. 21, 1997
(86) PCT No.: PCT/GB97/01106
  § 371 Date: Apr. 2, 1999
  § 102(e) Date: Apr. 2, 1999
(87) PCT Pub. No.: WO97/40626
  PCT Pub. Date: Oct. 30, 1997

(30) Foreign Application Priority Data
Apr. 22, 1996 (GB) .................................................. 9608271

(51) Int. Cl.⁷ .................................................. H04N 11/02
(52) U.S. Cl. .................. 348/425.1; 348/232; 375/240.23
(58) Field of Search .................................. 348/565, 498, 348/384, 405, 232, 398, 425.1; 709/201; 375/240.23, 240.26

(56) References Cited

U.S. PATENT DOCUMENTS

| | | | |
|---|---|---|---|
| 5,138,455 | * | 8/1992 | Greene .................. 348/398 |
| 5,280,345 | * | 1/1994 | Uehara et al. .......... 348/498 |
| 5,319,458 | * | 6/1994 | Shin ...................... 348/384 |
| 5,754,235 | * | 5/1998 | Urano .................... 348/405 |
| 5,764,286 | * | 6/1998 | Kawamura et al. ..... 348/232 |
| 5,838,377 | * | 11/1998 | Greene .................. 348/398 |

FOREIGN PATENT DOCUMENTS

| | | |
|---|---|---|
| 0 627 858 | 12/1994 | (EP) . |
| 0 627 858 A2 | 12/1994 | (EP) . |
| 0 637 893 | 2/1995 | (EP) . |
| 0 637 893 A1 | 2/1995 | (EP) . |
| 0 696 873 | 2/1996 | (EP) . |
| 0 696 873 A2 | 2/1996 | (EP) . |
| WO 95 35628 | 12/1995 | (WO) . |
| WO 9535628 | 12/1995 | (WO) . |

OTHER PUBLICATIONS

"Cheops: a modular processor for scalable video coding," V.M. Bove, et al. Visual Communications and Image Processing'91: Visual Communication, Boston, Nov. 11, 1991, pp. 886–893.

(List continued on next page.)

Primary Examiner—Ayaz Sheikh
Assistant Examiner—Khanh Quang Dinh
(74) Attorney, Agent, or Firm—McDermott, Will & Emery

(57) ABSTRACT

An integrated circuit for MPEG2 has a variable length decoder; a variable length coder; a decoder; and a coder. An information bus switch passes an information bus signal to the variable length coder, and as a control to the decoder and to the coder; and a picture bus signal switch is capable of routing signals through the coder and the decoder and to the variable length coder.

5 Claims, 7 Drawing Sheets

OTHER PUBLICATIONS

"FA 17.4: A single Chip Videophone Video Encoder/Decoder," M. Harrand, et al. IEEE International Solid State Circuits Conference, col. 38, Feb. 1, 1995, pp. 292, 293, 382.

"A Programmable Solution for Standard Video Compression," J. Fandrianto, et al. Institute of Electrical and Electronics Engineers, Feb. 24, 1999, pp. 47–50.

"A Multi–Standard Video Codec Architecture For the ISA/VL Bus," D. Fairfield. Proceedings of the International Conference on Signal Processing Applications and Technology, vol. 2, Oct. 18, 1994, pp. 1173–1178.

"A Multi–Standard Video CODEC Architecture for the ISA/VL Bus", D. J. Fairfield. Proceedings of the International Conference on Signal Processing Application and Technology, vol. 2, Oct. 18, 1994, pp. 1173–1178.

"A Programmable Solution for Standard Video Compression", J. Fandrianto, et al. Intellectual Leverage, San Francisco, Feb. 24–28, 1992, No. Conf. 37, Feb. 24, 1992, Institute of Electrical and Electronics Engineers, pp. 47–50.

"FA 17.4: A Single Chip Videophone Video Encoder/Decoder", IEEE International Solid State Circuits Conference, vol. 38, Feb. 1, 1995, pp. 292/293, 382.

"Cheops: A Modular Processor for Scalable Video Coding", V. M. Bove, et al. Visual Communication and Image Processing '91: Visual Communication, Boston, Nov. 11–13, 1991, vol. 1605 p. 02 of 2, Nov. 11, 1991.

* cited by examiner

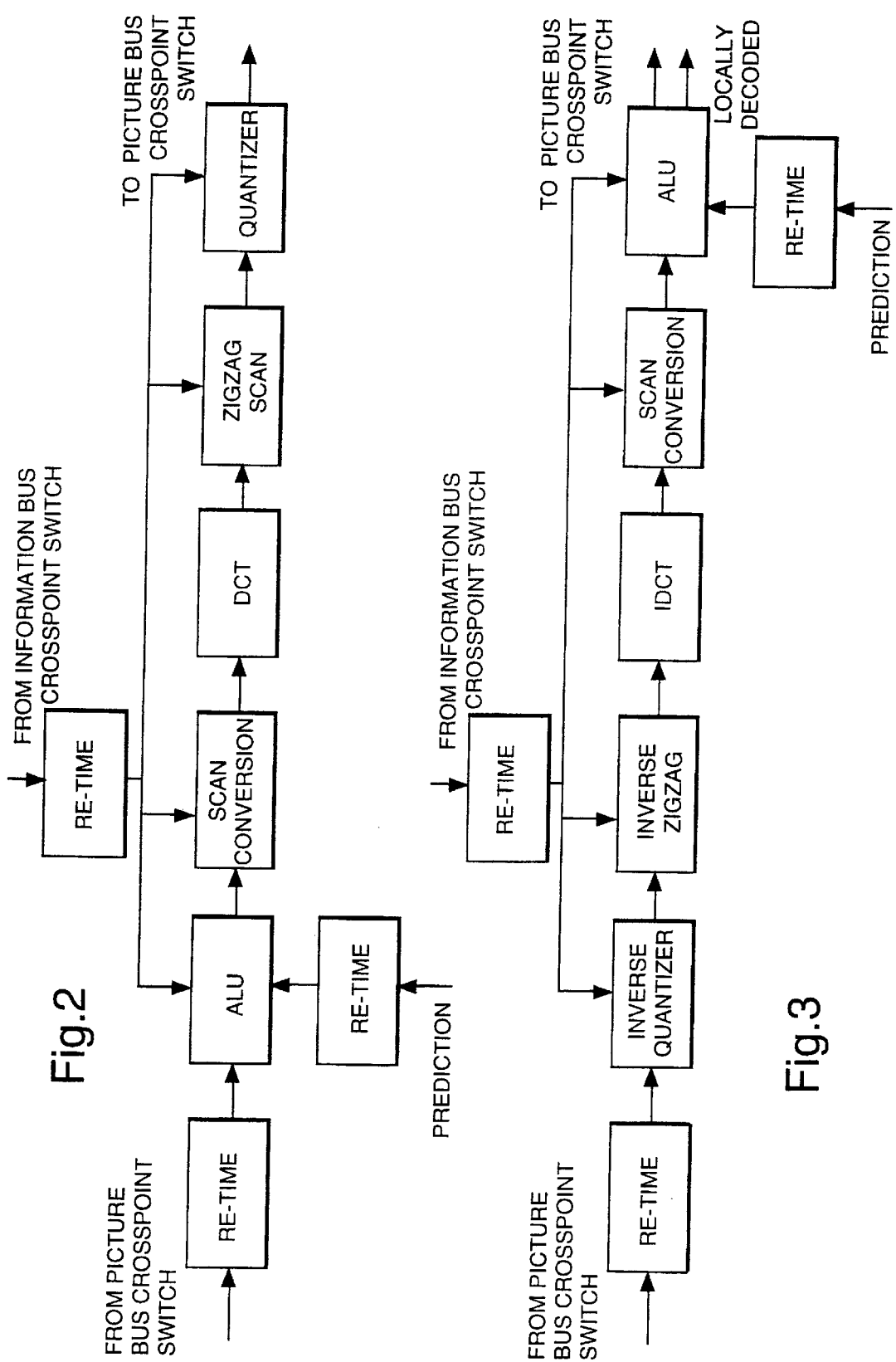

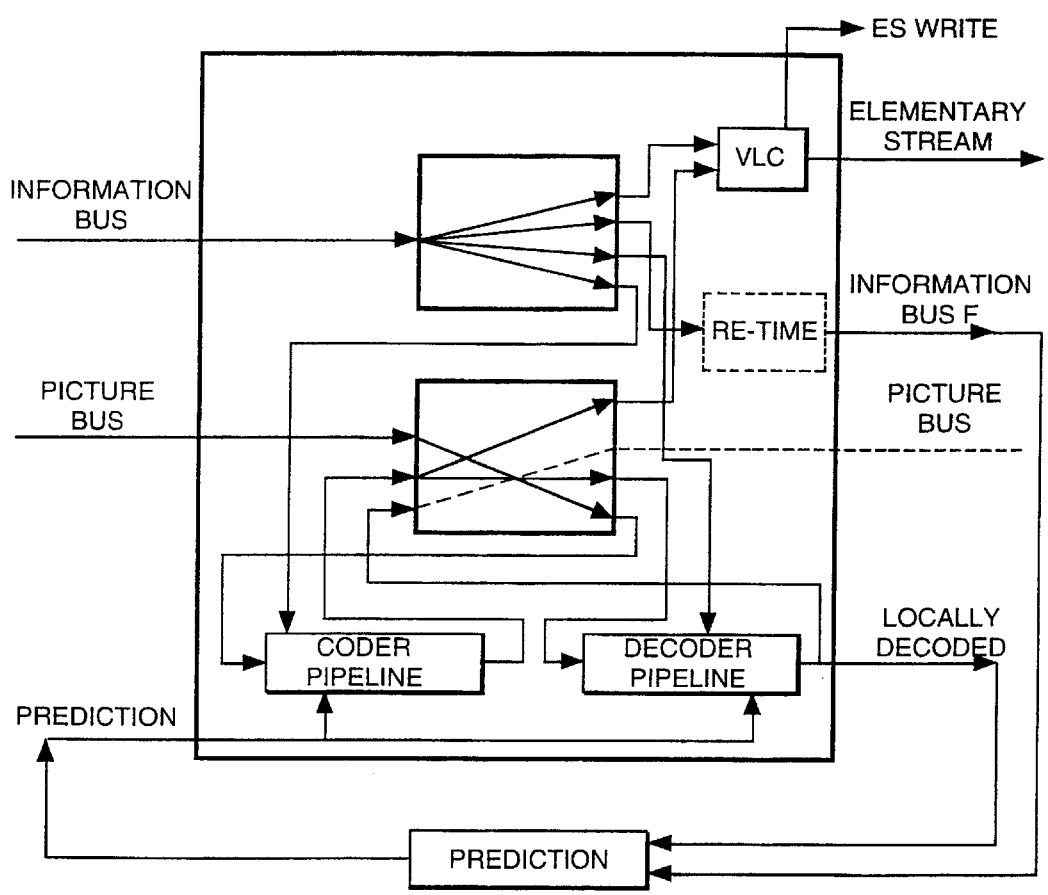

MULTIFUNCTION VIDEO COMPRESSION CIRCUIT

FIELD OF THE INVENTION

This invention relates to video compression and, in the most important example, to MPEG2 coders, decoders and the like.

BACKGROUND ART

With the general acceptance of MPEG2 as a standard for the digital compression of video signals, many groups world-wide have developed or are developing coders or decoders; chip-sets are now commercially available and others have been announced. It is generally found, however, that existing circuit designs are inflexible and are directed only towards the requirements for standard definition television, typically main profile at main level.

It is an object of the present invention, to provide circuits—suitable for integration—which are flexible and which offer compatibility with higher profiles and levels of MPEG.

It is an object of certain aspects of the present invention to provide circuits—suitable for integration—which offer compact implementation of functions that cannot be implemented with existing coding and decoding chips or chip—sets.

It is still a further object of aspects of the present invention to provide circuit designs—suitable for integration—which can be used to implement in a cascadable form, functions including not only coding and decoding but also bitstream switching and editing.

It is explained in WO-A-9535628 that an information signal can with great advantage be provided from (for example) a decoder to a re-coder or other processing element downstream in the signal chain. The information bus may contain motion vectors and MPEG coding decisions which can be employed in re-encoding or later processing. The same disclosure introduces the concept of a coefficient domain which is the result of partial decoding of a compressed signal. It is found that certain functions, which would otherwise require decoding, processing and re-encoding, can be conducted more efficiently and with less errors in this coefficient domain.

It is a further object of the present invention to provide circuit designs suitable for integration—which take advantage of various features disclosed in WO-A-9535628.

BRIEF SUMMARY OF THE INVENTION

Accordingly, the present invention consists in a multifunction circuit for use with compressed video signals, comprising a variable length decoder having an elementary stream input, an information bus output and a quantised coefficient stream output; a variable length coder having an information bus input, a quantised coefficient stream input and an elementary stream output; a decoder comprising an inverse quantiser and an inverse transform; a coder comprising a quantiser and a transform; first routing means capable of routing an information bus signal to the variable length coder, and as a control to the decoder and to the coder; and second routing means capable of routing signals through the coder and the decoder and to the variable length coder.

In one form of the invention, two like circuits are combined to receive respective different layers of a compressed bitstream.

BRIEF DESCRIPTION OF THE DRAWINGS

The invention will now be described by way of example with reference to the accompanying drawings in which:

FIG. 2 is a block diagram of a coder pipeline, forming part of the circuit of FIG. 1;

FIG. 3 is a block diagram of a de-coder pipeline forming part of the circuit of FIG. 1;

FIG. 4 is a block diagram of an application of the circuit of FIG. 1 as a dumb coder with standard information bus input;

DETAILED DESCRIPTION OF THE INVENTION

Figure 1:
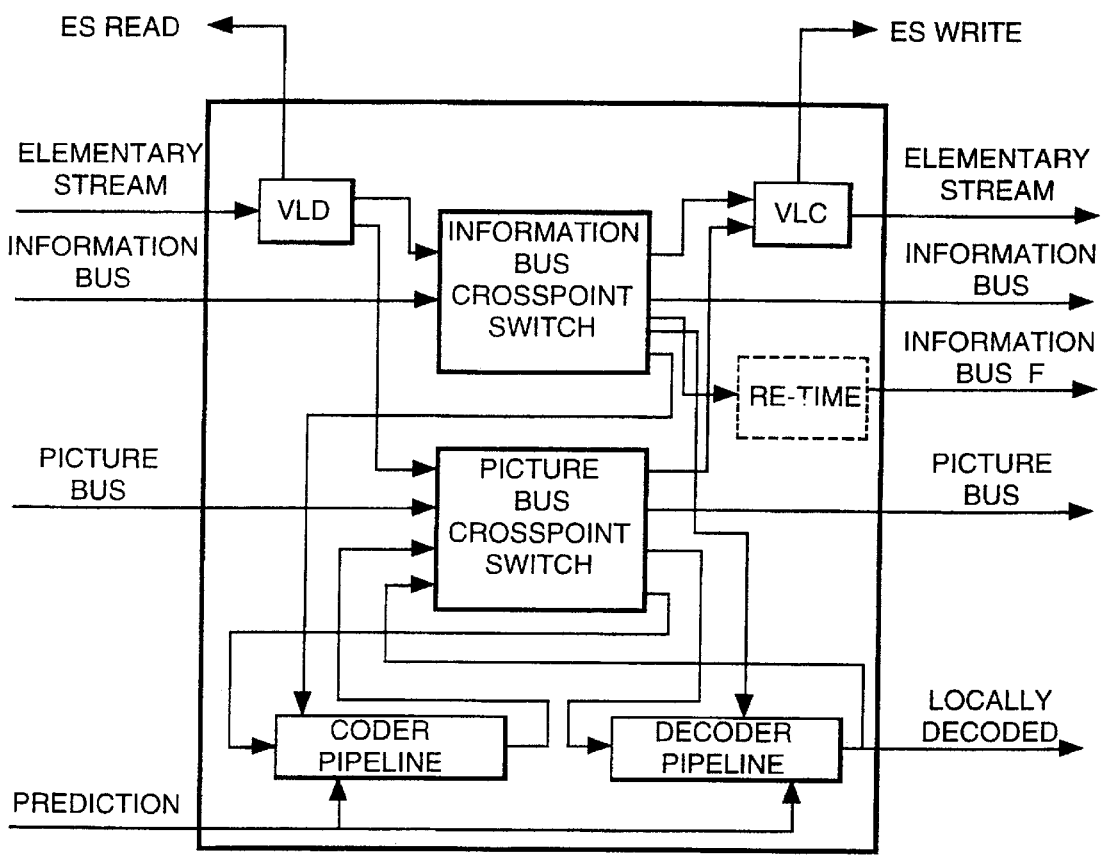
FIG. 1 is a block diagram of a circuit according to the present invention.

Referring first to FIG. 1, there is shown an overall block diagram of a circuit suitable for integration as a single chip. The extent of the proposed chip is shown in bold outline and various inputs and outputs are shown. A brief description of these inputs and outputs is given in the following table.

| Name | Input/ output | No. of bits (approx.) | Description |
| --- | --- | --- | --- |
| Elementary Stream | input | 32 | Video Elementary Stream or compressed Information Bus from buffer memory |
| ES read | output | 1 | Elementary stream buffer read request |
| Information Bus | input | 7 | 4-bit Information Bus + 3 timing signals |
| Picture Bus | input | 15 | Up to 12-bit (macro-)block-scanned Picture Bus + 3 timing signals |
| Prediction | input | 11 | 8-bit macroblock-scanned Picture Bus + 3 timing signals |

-continued

| Name | Input/output | No. of bits (approx.) | Description |
|---|---|---|---|
| Elementary Stream | output | 32 | Video Elementary Stream or compressed Information Bus to buffer memory |
| ES write | output | 1 | Elementary Stream buffer write enable |
| Information Bus | output | 7 | 4-bit Information Bus + 3 timing signals |
| Information Bus F | output | 7 | 4-bit Information Bus + 3 timing signals |
| Picture Bus | output | 15 | Up to 12-bit (macro-)block-scanned Picture Bus + 3 timing signals |
| Locally decoded | output | 11 | 8-bit macroblock-scanned Picture Bus + 3 timing signals |

The information bus has been previously described in WO-A-9535628 and in this arrangement is a 7-bit wide signal (4 information bits and 3 timing signals) which carries MPEG coding decisions. Also employed is a version of the information bus compressed using the MPEG2 syntax.

Another important signal used in the chip is the block-based picture bus, which carries pixels or DCT coefficients in a block-scanned or macroblock-scanned format, together with addressing and timing information. The picture bus is a 15-bit-wide signal (12 data bits and 3 timing signals).

The chip is designed to work in conjunction with a device which carries out the prediction function in MPEG2, conveniently this device may form part of a multi-mode device which performs prediction, picture re-ordering and format conversion at various points within the MPEG coding and decoding chain. The present chip does not replicate any of these functions, with the exception of the two simplest functions, block-to-macroblock and macroblock-to-block conversion, both of which are subsumed into the chip. The separate device may itself take the form of a chip.

The various functional blocks in FIG. 1 will be described in turn.

VLD

This is an MPEG-2 variable-length decoder. It takes in an elementary stream on a 32-bit bus from a video buffer under the control of the ES Read signal. It produces a picture bus signal containing 12-bit zigzag-scanned DCT coefficients and an information bus signal. The information bus contains fully decoded (i.e. not differentially coded) motion vectors and the picture bus contains fully decoded DC T coefficients.

In a possible alternative, the elementary stream input is 8 bits wide with a (bi-directional) clock enable signal, and an additional 32-bit buffer interface is provided together with buffer read and write signals. This would allow the VLD to perform some decoding prior to the buffer.

VLC

This is an MPEG-2 variable-length coder. Its inputs are a 12-bit zigzag-scanned picture bus signal and an information bus signal. It sends an elementary stream on a 32-bit bus to a video buffer, together with the ES Write signal which indicates the presence of valid data.

The VLC includes re-timing functions at both inputs so that the information bus and picture bus are aligned for coding.

Information Bus Crosspoint Switch

This is a very simple function which allows each output to be selected independently from any of the inputs. Both the information, and the timing signals are switched together. If there is no requirement for the switch to operate dynamically which is the case for all the applications so far envisaged, the switch configuration would be set at start-up and would then remain constant.

In certain applications, it will be helpful to include within the information bus crosspoint switch the capability to process the information bus in limited ways. For this purpose, a simple information bus modifier may be included.

Picture Bus Crosspoint Switch

This is a very simple function which allows each output to be selected independently from any of the inputs. Both the data and the timing signals are switched together. If there is no requirement for the switch to operate dynamically which is the case for all the applications so far envisaged, the switch configuration would be set at start-up and would then remain constant.

Re-time

This is a programmable delay function that re-times the information bus F output so that it matches the locally decoded output to the prediction device.

Coder Pipeline

The main features of the coder pipeline are the ALU, the DCT and the quantiser. The ALU is dynamically programmable as an adder, a subtractor or to pass either of the inputs to the output. In an MPEG coder loop, it fulfils the function of the subtractor for predicted macroblocks. The 8×8 DCT is the standard function defined in the MPEG specification; in addition, it can be programmed to pass signals unchanged from input to output. The quantiser is as defined (by implication) in the MPEG specification. It includes the application of quantiser weighting matrices and the quantiser scale factor provided by the information bus; it can also be programmed to pass signals unchanged from input to output.

Further functions of the coder pipeline are the scan conversions, first, from macroblock to block scanning format at the input to the DCT; second, from block scanning format at the output of the DCT to zigzag scanning format.

Finally, there are the important re-timing functions at all the inputs. These work together, using the addressing information present on the picture bus and Information bus inputs, to co-time the resulting inputs to the coder pipeline.

Decoder Pipeline

A block diagram of this function is given in FIG. 3.

The main features of the decoder pipeline are the inverse quantiser, the IDCT and the ALU. The inverse quantiser is as defined in the MPEG specification. It includes the application of quantiser weighting matrices and the quantiser scale factor provided by the information bus; in addition, it can be programmed to pass signals unchanged from input to output. The 8×8 IDCT is the standard function defined in the MPEG specification; it can also be programmed to pass signals unchanged from input to output. The ALU is dynamically programmable as an adder, a subtractor or to pass either of the inputs to the output. In an MPEG coder loop, it fulfils the function of the local decoder adder for predicted macroblocks.

Further functions of the decoder pipeline are the scan conversions, first, from zigzag to block scanning format at the input to the IDCT; second, from block scanning format at the output of the IDCT to macroblock scanning format.

Finally, as for the coder pipeline, there are the important re-timing functions at all the inputs. These work together, using the addressing information present on the picture bus and information bus inputs, to co-time the resulting inputs to the decoder pipeline. In an MPEG coder loop, the re-timing delay at the prediction input serves as the compensating delay for the coder and decoder pipelines.

A number of possible applications of the invention will now be described. Reference is first directed to FIG. 4 which shows a dumb coder with standard information bus input.

In this application, the input information bus and picture bus are derived externally. The information bus is routed to all functions on the chip and to an external prediction device. The picture bus, which is macroblock-scanned pixels, passes through the coder and decoder pipelines to form the locally decoded output which is passed to the prediction device. The prediction output from this device is passed to the coder and decoder pipelines to complete the coder loop. The DCT coefficients at the output of the coder pipeline are also routed to the VLC together with the information bus for calculation of the output elementary stream. The picture bus output can be used to monitor the locally decoded signal as shown, or any other input to the picture bus crosspoint switch.

Figure 5:
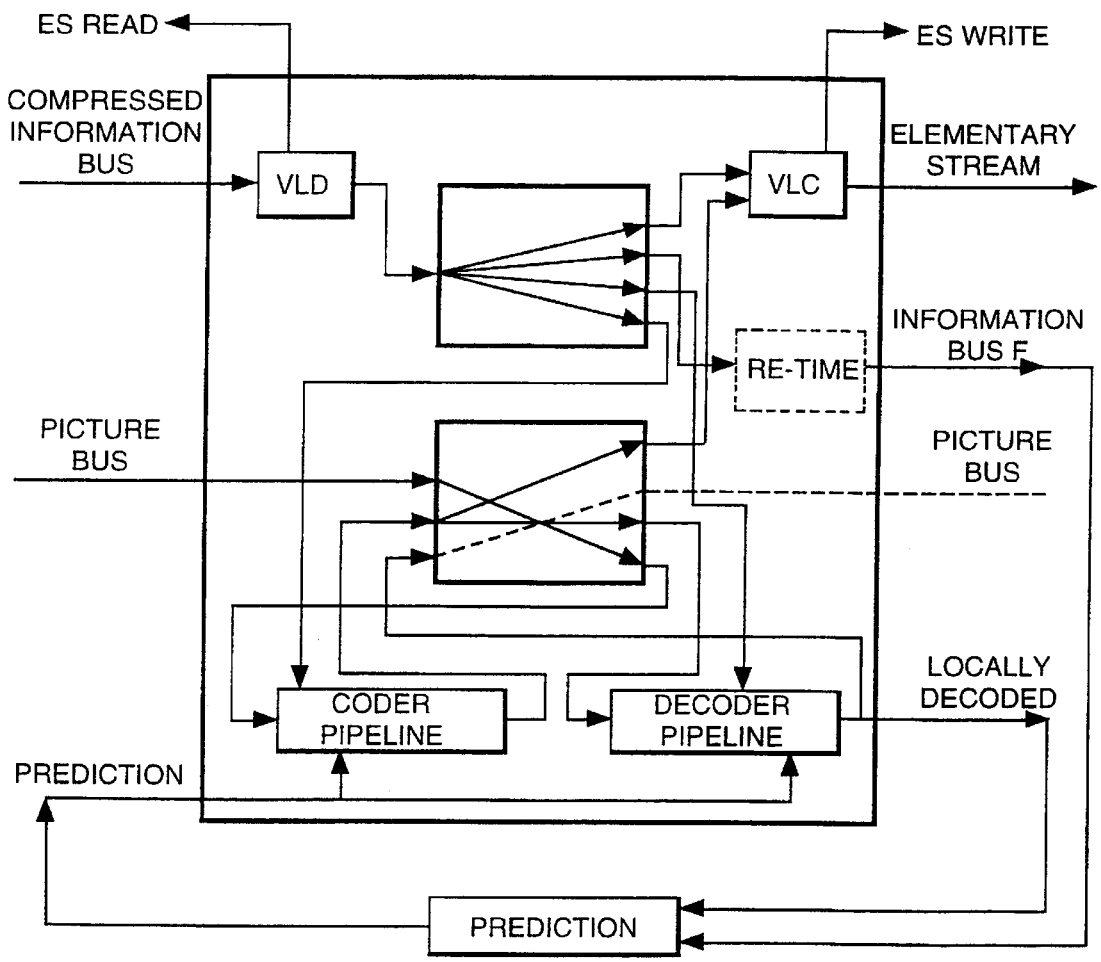
FIG. 5 is a block diagram of an application of the circuit of FIG. 1 as a dumb coder with compressed information bus input.

Reference is now directed to FIG. 5 which shows a dumb coder with compressed information bus input.

This application is identical to the one described above except that the information bus is derived by decoding a compressed information bus using the VLD. Note that in this application both the standard information bus input and output are available and can be used as a "breakout" to modify the information bus if required.

Figure 6:
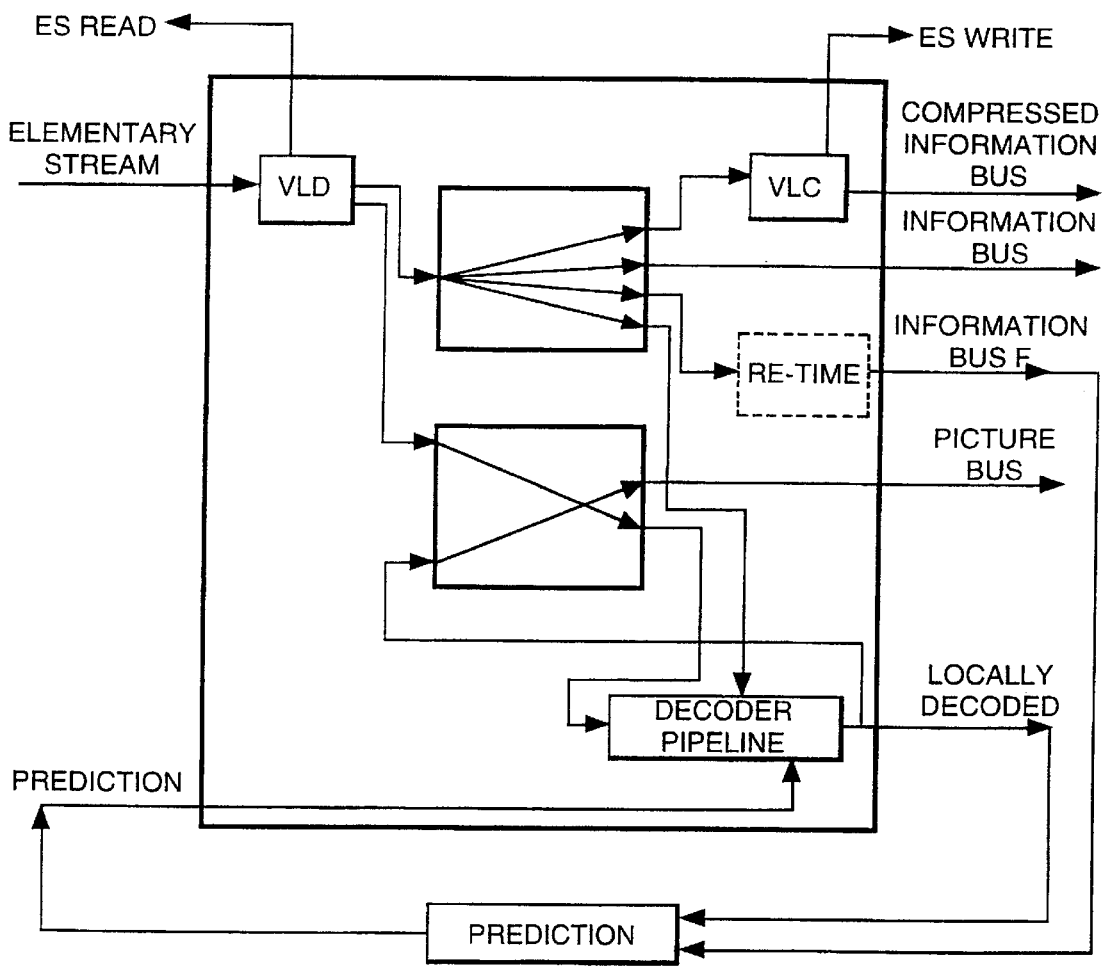
FIG. 6 is a block diagram of an application of the circuit of FIG. 1 as a decoder with information bus and compressed information bus outputs.

Turning now to FIG. 6, there is illustrated a decoder with standard information bus and compressed information bus outputs.

In this application, the coder pipeline is not used. The incoming elementary stream is decoded and the resulting information bus routed throughout the chip and to an external prediction device. The picture bus, which is zigzag-scanned DCT coefficients, is routed to the decoder pipeline and the resulting decoded picture becomes the macroblock-scanned output. This is then converted to raster scanning and re-ordered by external circuits. The optional compressed information bus output is provided by routing the information bus to the VLC; note that no picture bus is required in this case.

Figure 7:
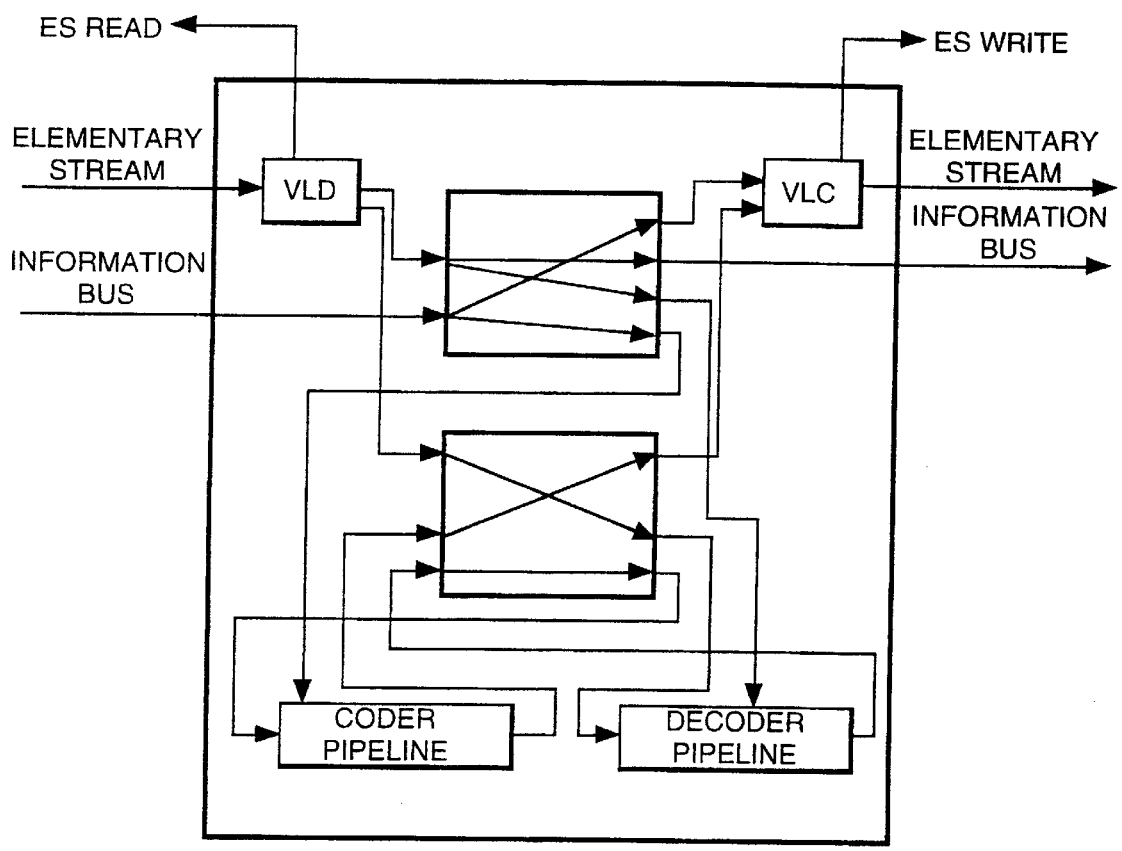
FIG. 7 is a block diagram of an application of the circuit of FIG. 1 as a bit-rate transcoder for small bit-rate changes.

FIG. 7 shows a bit-rate transcoder for small bit-rate changes.

This application relies on the assumption that small bit-rate changes can be made by simply re-quantising DCT coefficients under the control of a rate control algorithm which works at the new bit-rate. The absence of coder and decoder prediction loops means that 'drift' is introduced into the signal, but if the changes made are small the resulting impairment may be negligible.

The elementary stream is decoded and the resulting information bus is passed to the decoder pipeline and to the output of the chip for external processing. Typically, this processing will change only the quantiser scale codes. The processed information bus re-enters the chip and is routed to the coder pipeline and to the VLC. Meanwhile, the picture bus passes directly from the decoder pipeline to the coder pipeline. In the pipelines, the ALU functions are set to ignore the prediction inputs and the DCT and IDCT blocks are by-passed.

A general transcoder application of this invention (not shown in the drawings) consists of a decoder followed by a dumb coder, with standard information bus and macroblock-scanned picture bus signals passing between the two, via some intermediate processing. Two chips are required, each connected to a device generating predictions. Note that, unless the transcoding operation requires a change to the Group of Pictures (GOP) structure of the signal or processing of raster-scanned signals, there is no need for picture re-ordering or macroblock-raster conversion to be carried out.

Figure 8:
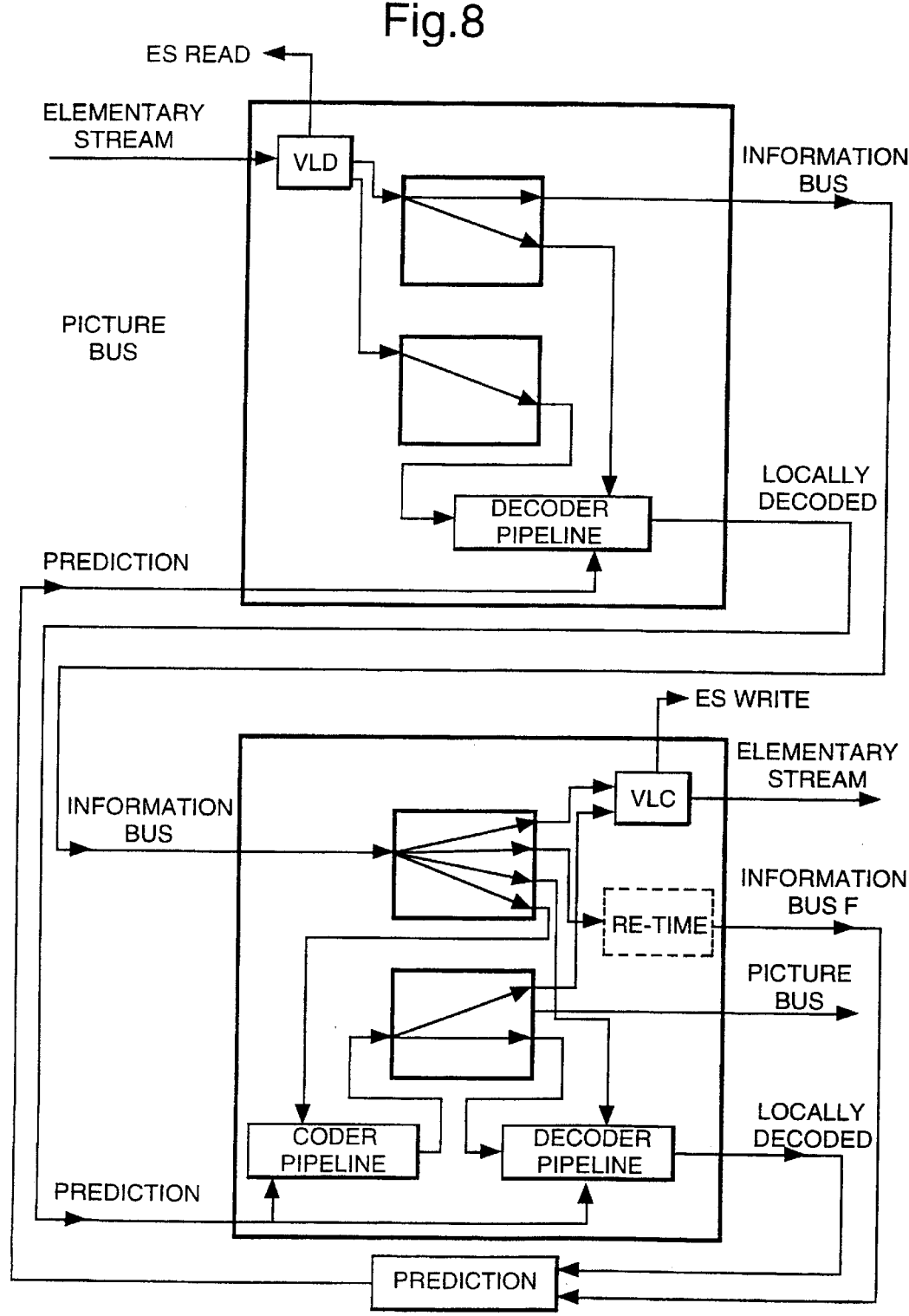
FIG. 8 is a block diagram of an application of the circuit of FIG. 1 as a reduced complexity transcoder.

A reduced-complexity transcoder is illustrated in FIG. 8. This novel configuration reduces the requirements of the general transcoder from two external chips to one, in the event that the decoder and coder predictor have identical information bus inputs (i.e. the coding mode and motion vectors are unchanged between the decoder and coder).

In the first chip according to this invention, the ALU in the decoder pipeline is configured as a subtractor and the 'prediction' input is taken from the external predictions chip. In the second chip, the coder pipeline is set to pass the 'prediction' input which is in fact connected to the 'locally decoded' output of the first chip, and the decoder pipeline ALU is configured as a subtractor. The result of all this is that the input to the external chip is in fact equal to the additional quantisation error introduced by the re-coding operation.

A circuit according to the present invention could be adapted to implement the SNR Scalable profile of MPEG-2 by making small modifications. The coder pipeline would have an additional output to the crosspoint switch, at the output of the DCT stage. The decoder pipeline would have an additional ALU between the inverse quantiser and the IDCT, with an additional input coming from the crosspoint switch. An additional picture bus input would be provided for the picture bus crosspoint switch. This would allow an SNR Scalable profile dumb coder to be implemented using two chips, and an SNR Scalable decoder to be implemented using two chips.

It is intended that a chip according to the present invention can be designed to work at a high enough clock rate to implement the 4:2:2 profile of MPEG-2 without modification.

The capability of the chip to work at higher levels depends on its maximum clock rate. In the event that the clock rate is insufficient for a single chip to perform HDTV coding or decoding, a well-known solution is to split the picture into horizontal or vertical panels and process each panel in parallel using one chip. An advantage of the present invention is that it leaves the more difficult problem of generating predictions (which involves communicating between the panels) outside the chip.

What is claimed is:

1. A circuit capable of adopting a number of different configurations, each having a distinct function for use with compressed video signals, comprising:

a picture signal input terminal for receiving a picture signal;

an information bus input terminal for receiving an information bus signal representing compression coding decisions;

an elementary stream input terminal for receiving an elementary stream;

a picture signal output terminal;

an information bus output terminal;

an elementary stream output terminal;

a variable length decoder having an elementary stream input, an information bus output and a quantised coefficient strewn output and being connected to receive at the elementary stream input an elementary stream from said elementary stream input terminal;

a variable length coder having an information bus input, a quantised coefficient stream input and an elementary stream output and being connected to deliver at the elementary stream output terminal an elementary stream from said elementary stream output;

a decoder comprising an inverse quantiser and an inverse transform, the decoder having a quantised coefficient stream input, an information bus input and a picture signal output;

a coder comprising a quantiser and a transform, the coder having a picture signal input, an information bus input and a quantised coefficient stream output;

a first crosspoint switch capable of routing an information bus signal from the information bus input terminal to the variable length coder, to the decoder and to the coder and of routing an information by signal from the variable length decoder to the decoder; and a second cross point switch capable of routing a picture signal from the picture signal input terminal to the coder and a quantised coefficient stream from the coder to the decoder and the variable length coder, wherein in one configuration, the routing by the first and second crosspoint switches of the information bus signal and the quantised coefficient stream to the decoder enables the circuit to perform decoding functions, and wherein in another configuration, the routing by the first and second crosspoint switches of the information bus signal and the picture signal to the coder enables the circuit to perform coding functions.

2. A multifunction circuit according to claim 1, wherein the first crosspoint switch is capable of routing an information bus signal from the variable length decoder to the variable length coder and to the information bus output terminal.

3. A multifunction circuit according to claim 1, wherein the second crosspoint switch is capable of routing a picture signal from the decoder to the picture signal output terminal.

4. A multifunction circuit according to claim 1, wherein the second crosspoint switch is capable of routing a quantised coefficient stream from the variable length decoder to the decoder.

5. A multifunction circuit according to claim 1, wherein the second crosspoint switch is capable of routing a quantised coefficient stream from the coder to the decoder.

* * * * *